April 21, 1936.  C. M. ELLENBERGER  2,038,209
TIRE COVER
Original Filed Sept. 19, 1927
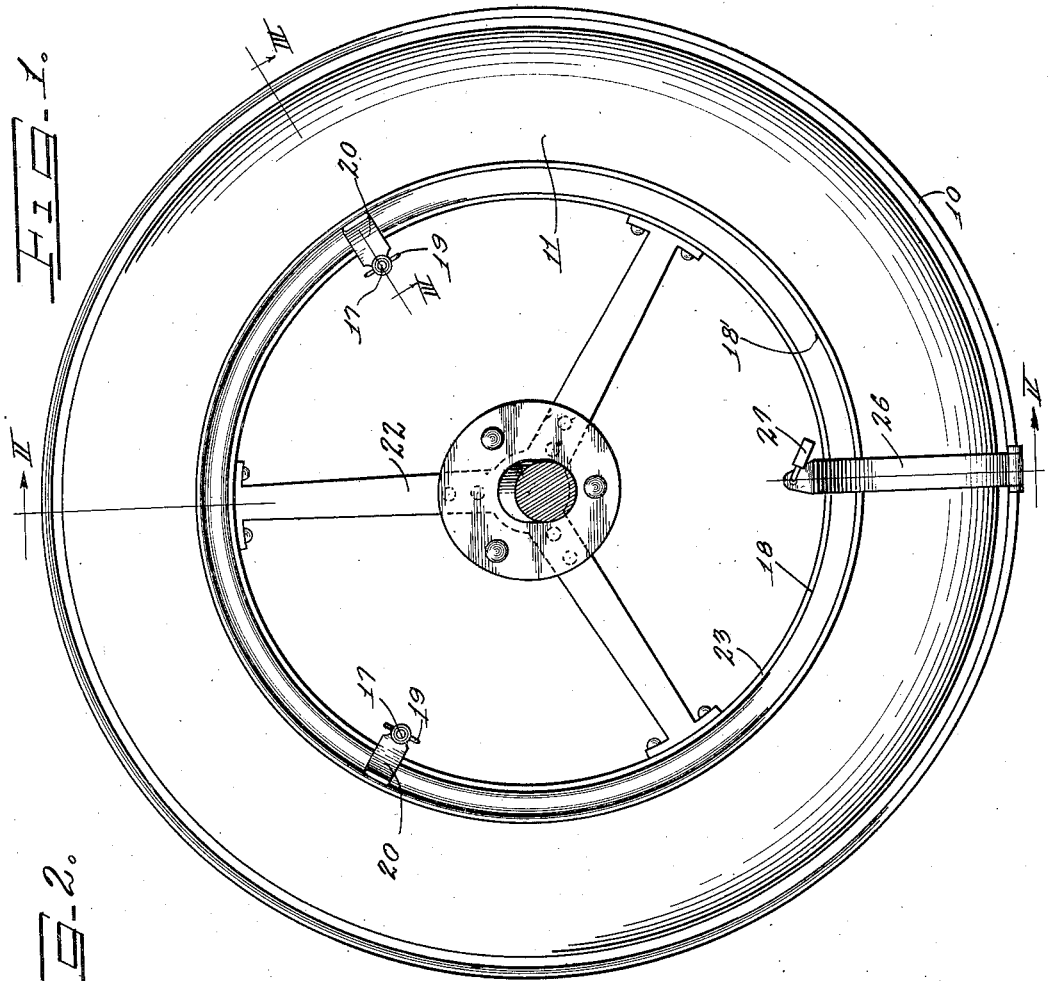
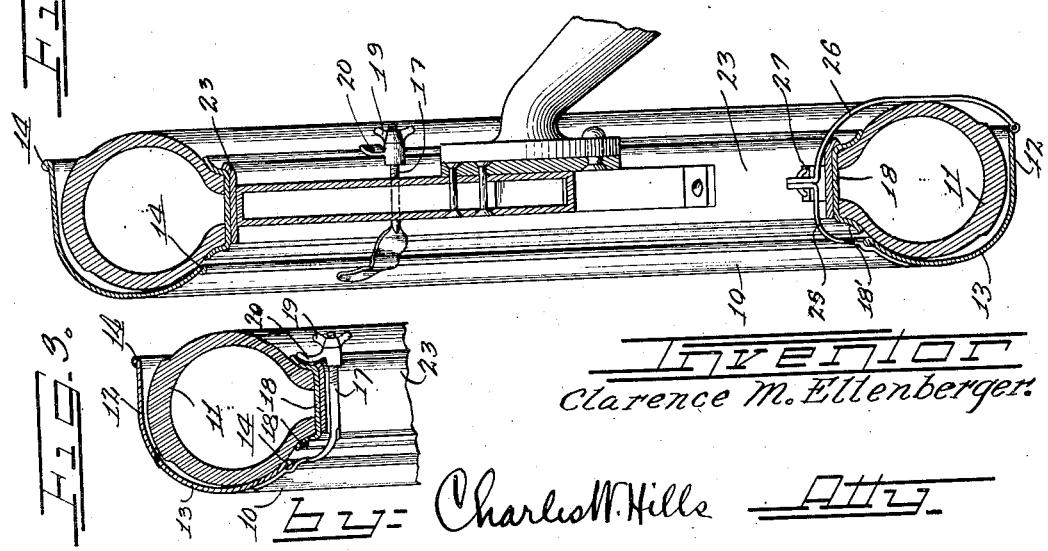
Inventor
Clarence M. Ellenberger
By Charles W. Hills Atty Patented Apr. 21, 1936

2,038,209

UNITED STATES PATENT OFFICE 2,038,209

TIRE COVER

Clarence M. Ellenberger, Detroit, Mich., assignor to Lyon Cover Company, Detroit, Mich., a corporation of Michigan Original application September 19, 1927, Serial No. 220,411, now Patent No. 1,886,270, dated November 1, 1932. Divided and this application October 7, 1932, Serial No. 636,622

5 Claims. (Cl. 150—54)

My invention is concerned with covers for the spare tires carried by automobiles. Nearly all such covers of which I am aware are constructed of fabric and have the disadvantage that they are attached and detached with considerable difficulty. Such tire covers are additionally objectionable in that they frequently collect moisture and not only rot themselves, but also have a harmful effect upon the tires to which they are applied.

It is an object of my invention to produce a spare tire cover which may be attached to or detached from the spare tire with ease, which will form an adequate protection for the tire, which can be made in quantities at less cost than fabric covers, and which will be attractive in appearance. A further object of the invention is to incorporate with such tire cover a suitable lock adapted to prevent theft of the tire and cover.

I accomplish the above objects by constructing my tire cover of sheet metal or other rigid material drawn, stamped, rolled, or otherwise formed into an annulus adapted to be slid onto and off of the tire by axial movement and which, when in place on the tire, will overlie the tread and the outer side wall of the tire. I provide means for holding the tire cover in place; and, if desired, I provide a locking device by which the cover and tire may be secured to the tire carrier.

The present invention constitutes a division of the subject matter disclosed in my copending patent application Serial No. 220,411, filed September 19, 1927, and issued November 1, 1932, as Patent No. 1,886,270.

Other objects and features of this invention will more fully appear from the following detailed description taken in connection with the accompanying drawing which illustrates a single embodiment thereof and in which Figure 1 is a side elevation of an inner face of a spare tire with my cover in place thereon;

Figure 2 is an enlarged section on the lines II—II of Figure 1 looking in the direction indicated by the arrows; and Figure 3 is an enlarged fragmentary section on the lines III—III of Figure 1 looking in the direction indicated by the arrows.

In the drawing:

My tire cover may, in accordance with the illustrated form of the invention, be formed in a single piece 10 of sheet metal or similar material which possesses the requisite characteristics and which is drawn, stamped, rolled, or pressed into an annular form adapted to be mounted upon the spare tire 11 by axial movement. The cover body 10 is formed with an outer wall 12 and a side wall 13 which are desirably continuous with each other, the outer wall 12 overlying the tread of the tire and the side wall 13 overlying the side wall of the tire. The edges of the two walls 12 and 13 are preferably rolled over to form beads 14 which serve to strengthen the cover.

At spaced points on the side wall 13 of the cover 10, I secure rods 17 which project inward and through the rim 18 on which the tire 11 is mounted. The free ends of the rod 17 are threaded for the reception of thumb nuts 19 which, through the medium of clips 20 slidably mounted on the rods 17, serve to clamp the cover in place on the tire 11 and rim 18.

When my tire cover is used in connection with a spare tire mounted upon a tire carrier 22 having a circular rim 23, I may incorporate with my tire cover a locking device for preventing unauthorized removal of either the tire cover or the tire. To this end, I may secure to the side wall 13 of the cover 10 a fixed strap 25 projecting inwardly and preferably part way through the rim 23 of the tire carrier. To the outer wall of the tire cover I pivotally attach a movable strap 26, the free end of which is adapted to be moved into close association with the end of the strap 25. The two ends of the straps 25 and 26 may be provided with aligned holes for the reception of the hasp of a padlock 27, as is clear from Figs. 1 and 2.

Desirably, my tire cover is formed so that the diameter of the bead 14 forming the terminal edge of the side wall 13 is considerably larger than the diameter of the flange 18' of the tire rim 18, as the means which hold the tire cover in place on the tire will tend to hold the tire and its cover concentric and will thus tend to prevent contact of the rim flange 18' and the cover 10. Such a contact would be undesirable, for it would inevitably result in the creation of disagreeable rattles. While this tendency of the cover-holding means exists, I prefer to insure that no contact of the side wall 13 with the rim-edge 18' can occur, by making the outer wall 12 of the tire cover 10 of such a diameter that it will engage the tire tread before the side wall 13 can strike the rim flange 18'.

A tire cover such as I have described is readily attached and detached from the associated spare tire. Being made of metal or similar material, it is very durable in comparison with the fabric covers normally used. Further, it is readily finished in the same colors as are employed on the body of the automobile, and thus adds to the appearance thereof.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. As an article of manufacture, a ring-like spare tire cover of substantially form-retaining material including side and band portions for disposition over the outer side wall and tread respectively of the tire, and means extending rearwardly from said side portion and inwardly of the tire for cover-retaining cooperation with a flange of the spare tire rim, said side portion being transversely curved and interiorly concave so as to conform to the contour of said outer side wall and said retaining means being connected to said curved side wall adjacent the wheel rim.

2. In a spare tire and cover assembly including a spare tire and a supporting member disposed centrally of and laterally within the tire for supporting same, a spare tire cover having a portion disposed over an outer side wall of the tire and a portion disposed over the tread of the tire, clamping means for the cover including a clamping strap connected at its outer end to the rear edge of said tread portion of the cover and extending substantially radially inward along the rear side of the tire with its inner end held in place inwardly of the tire adjacent said central supporting member.

3. In a spare tire and cover assembly including a spare tire and a supporting member disposed centrally of and laterally within the tire for supporting same, a spare tire cover having a portion disposed over an outer side wall of the tire and a portion disposed over the tread of the tire, clamping means for the cover including a clamping strap connected at its outer end to the rear edge of said tread portion of the cover and extending substantially radially inward along the rear side of the tire with its inner end held in place inwardly of the tire adjacent said central supporting member, and means at the outer side of the cover for connecting said outer side portion of the cover to said supporting member laterally inward of the tire.

4. In a spare tire and cover assembly and a support therefor, said assembly including a tire carrier, means extending inwardly from said carrier and detachably fastened to said support, an outer spare tire cover made of metallic sheet or the like and having a part projecting radially and transversely inwardly from an outer side portion of the cover and means located transversely inwardly of said side portion of the cover for securing said part and, therefore, the cover to the support.

5. In a spare tire and cover assembly and a support therefor, said assembly including a tire carrier, means extending inwardly from said carrier and detachably fastened to said support, an outer spare tire cover made of metallic sheet or the like and having a part projecting radially and transversely inwardly from an outer side portion of the cover and means located transversely inwardly of said side portion of the cover for securing said part and, therefore, the cover to the support, said outer side portion of the cover being outwardly convex and of a transverse curvature conforming generally to that of an outer side wall of the tire.

CLARENCE M. ELLENBERGER.